No. 783,849. PATENTED FEB. 28, 1905.
T. N. WINSLOW.
FEED AND WATER BAG.
APPLICATION FILED JUNE 9, 1904.

WITNESSES:
Geo. P. Kingsbury.
A. R. Fay.

INVENTOR
Theophelus N. Winslow
BY
ATTORNEYS

No. 783,849. Patented February 28, 1905.

UNITED STATES PATENT OFFICE.

THEOPHELUS N. WINSLOW, OF BAYONNE, NEW JERSEY.

FEED AND WATER BAG.

SPECIFICATION forming part of Letters Patent No. 783,849, dated February 28, 1905.

Application filed June 9, 1904. Serial No. 211,826.

*To all whom it may concern:*

Be it known that I, THEOPHELUS N. WINSLOW, a citizen of the United States, and a resident of Bayonne, in the county of Hudson and State of New Jersey, have invented a new and Improved Feed and Water Bag, of which the following is a full, clear, and exact description.

My invention relates to a feed-bag for animals which is capable of use as a watering device. The feed-bags in use at present are merely deep canvas bags, which are hung upon a horse's head and have a front side which covers up the head and prevents fresh air from being obtained while eating. This construction is necessitated by the amount of feed which it is necessary to supply to a horse. Furthermore, the present feed-bags are not capable of containing water, and consequently they have to be removed and a water-bucket supplied, necessitating the carrying around of both of these devices at all times.

My invention has for its objects to overcome these and other objections to the present feed-bags.

Reference is to be had to the accompanying drawings, forming a part of this specification, in which similar characters of reference indicate corresponding parts in all the figures.

Figure 3:
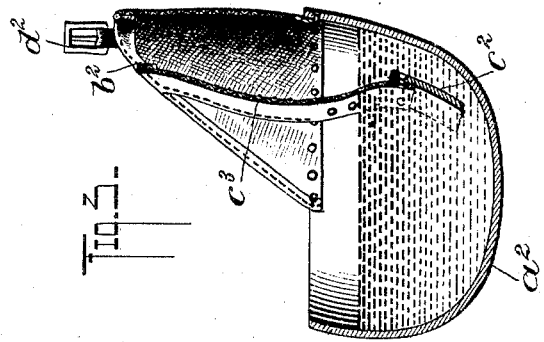
Figure 2:
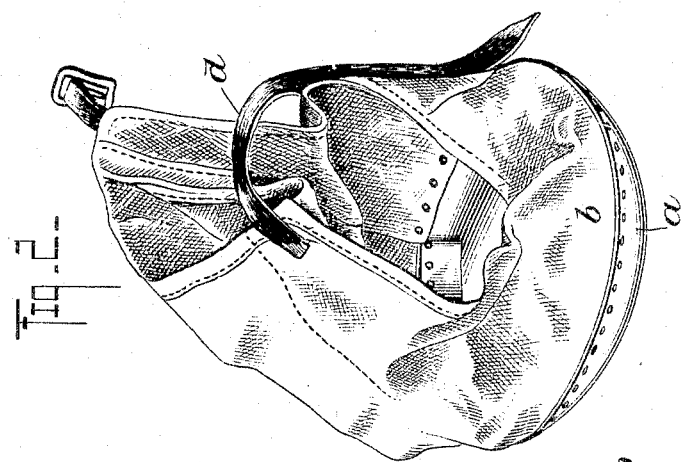
Figure 1:
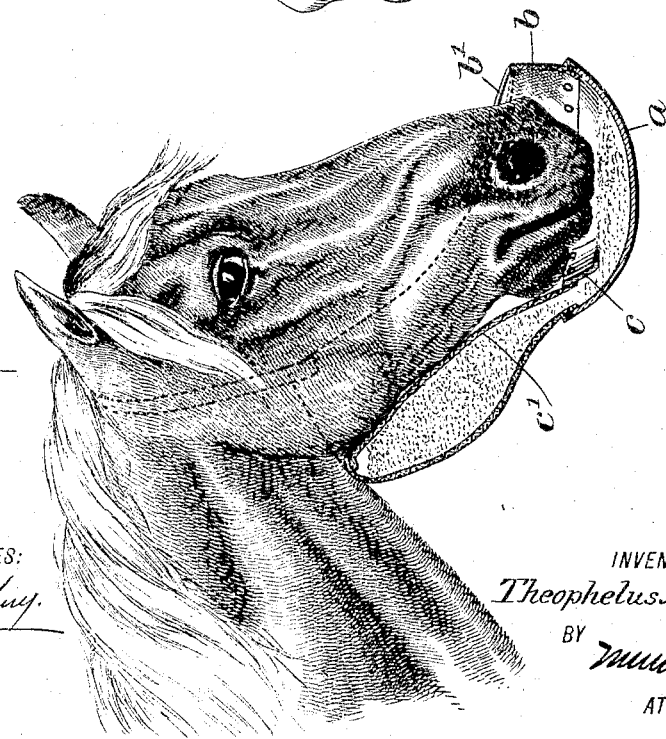

Figure 1 represents a preferred form of my invention in longitudinal section and shows the head of a horse and the manner in which the bag is applied thereto. Fig. 2 is a perspective view of the feed-bag, and Fig. 3 is a longitudinal sectional view of a modification.

In the form shown in Figs. 1 and 2 a metallic bottom $a$ is used, which slopes from all sides toward the center, but is provided with a specially-strong slope at the rear portion. This bottom or bowl is preferably made of galvanized metal. To the upper edge of the bowl is secured a canvas bag $b$. A partition $c$ is provided at the rear portion of the bowl $a$, and the bag is also provided with a canvas partition $c'$, forming a continuation of the partition $c$. These partitions, together with the rear walls of the bowl and bag, constitute a hopper for the supply of grain. It will be understood that this hopper is preferably placed at the rear part of the bag and under the horse's neck and that by supplying grain to the hopper its contracted lower portion formed by the partition $c$ will permit the grain to be fed into the bowl $a$ as it is used by the horse. On account of this construction the bag need not be as high on the front side as bags in common use are made, but it may be cut away, as shown at $b'$, so as to allow the horse to have a free breathing-space. The bag may be attached to the horse's head by means of a strap $d$ or by any other fastening device that may be desirable or necessary.

It will be observed that the horse will be freely supplied with grain as fast as he consumes it and that there is absolutely no waste of grain when this construction is employed. When the horse cannot reach the grain in the present feed-bag, the head is naturally thrown up, so that he can reach it, and in his effort to do so much of the grain is thrown to the ground. With the old form a horse is frequently caused to suddenly lift his head or toss it from side to side on account of the lack of air and the dust which rises from the grain, and this results in throwing more or less grain out of the bag, and, furthermore, in order to permit the horse to reach the grain at all times it is necessary for a man to be on hand to adjust the height of the bag from time to time. It is not usually possible to so adjust it at all times as to permit the horse to eat all that is put into the bag, and consequently a source of loss present in the old form of bag is obviated in the form herein described and shown.

My improved bag needs no watching while the horse is feeding, as the nose is always the right distance from the grain. When feeding, the horse's nose is always above the grain, which prevents the grain and the dust arising from it from getting into his nostrils and causing discomfort and scattering of the grain. The metallic bottom prevents the bag from ever getting musty and provides for much longer wear than is customary with the bags at present known. The bag is intended to be made in different sizes, according to the amount of grain to be fed.

In Fig. 3 I have illustrated a modified form comprising a bowl $a^2$, which is not as shallow as the bowl $a$, (illustrated in the other figures,)

but is deep enough to contain about ten quarts of water. The canvas bag $b^2$, applied to this bowl, does not contain the front portion below the cut-away part $b'$, (shown in the other figures,) but is only attached to the rear portion of the bowl $a^2$. The partitions $c^2$ and $c^3$ correspond substantially with the partitions $c$ and $c'$, (shown in the other figures,) and the strap $d^2$ may be of the same or similar construction to the strap $d$. The hopper formed in this bag can be used for grain, as in the other case, and the same bag may be used for watering the animal. The advantage of having a single receptacle for serving both these purposes will be obvious.

While I have described and illustrated a particular embodiment in which my invention may be constructed, it will be understood that it is not limited to the exact details thereof, but is capable of being made in many other forms.

Having thus described my invention, I claim as new and desire to secure by Letters Patent—

1. A feed-bag formed of an upper and a lower part, the lower part comprising a bowl of rigid material having a bottom which has an approximately spherical curvature and a sloping rear wall, and provided in its rear portion with a stationary partition having its lower part nearer the said rear sloping wall of the bowl than its upper part and forming with the said rear wall of the bowl a passage of fixed dimensions, said upper part extending upwardly from the top of the bowl and formed of flexible material and having its lower edge secured around the rim of the bowl, said upper portion being open at the front from a short distance above the top of the bowl and provided with a flexible upwardly-extending partition secured at its lower edge to the partition in the bowl to form a continuation thereof, the said flexible partition forming with the rear wall of said upper part a hopper for feed material, said hopper being open at the top, and securing-straps adapted to pass over the top of the horse's head to hold the bag in operative position, said straps being secured to the rear wall of the hopper.

2. A feed-bag formed of an upper and a lower part, the lower part comprising a bowl of rigid material having a bottom which has an approximately spherical curvature and a sloping rear wall, and provided in its rear portion with a stationary partition having its lower part nearer the said rear sloping wall of the bowl than its upper part and forming with the said rear wall of the bowl a passage of fixed dimensions, said upper part extending upwardly from the top of the bowl and formed of flexible material and having its lower edge secured to the top of the bowl, said upper portion being open at the front and provided with a flexible upwardly-extending partition secured at its lower edge to the partition in the bowl to form a continuation thereof, said flexible partition forming with the rear wall of said upper part a hopper for feed material, said hopper being open at the top, and securing-straps adapted to pass over the top of the horse's head to hold the bag in operative position, said straps being secured to the rear wall of the hopper.

In testimony whereof I have signed my name to this specification in the presence of two subscribing witnesses.

THEOPHELUS N. WINSLOW.

Witnesses:
JNO. M. RITTER,
A. E. FAY.